(No Model.)  2 Sheets—Sheet 1.

I. L. G. RICE.
PAIL STAVE AND HOOP.

No. 342,135. Patented May 18, 1886.

WITNESSES.
Frank G. Parker
Matthew M. Blunt

INVENTOR.
Israel L. G. Rice.

(No Model.) 2 Sheets—Sheet 2.
I. L. G. RICE.
PAIL STAVE AND HOOP.
No. 342,135. Patented May 18, 1886.
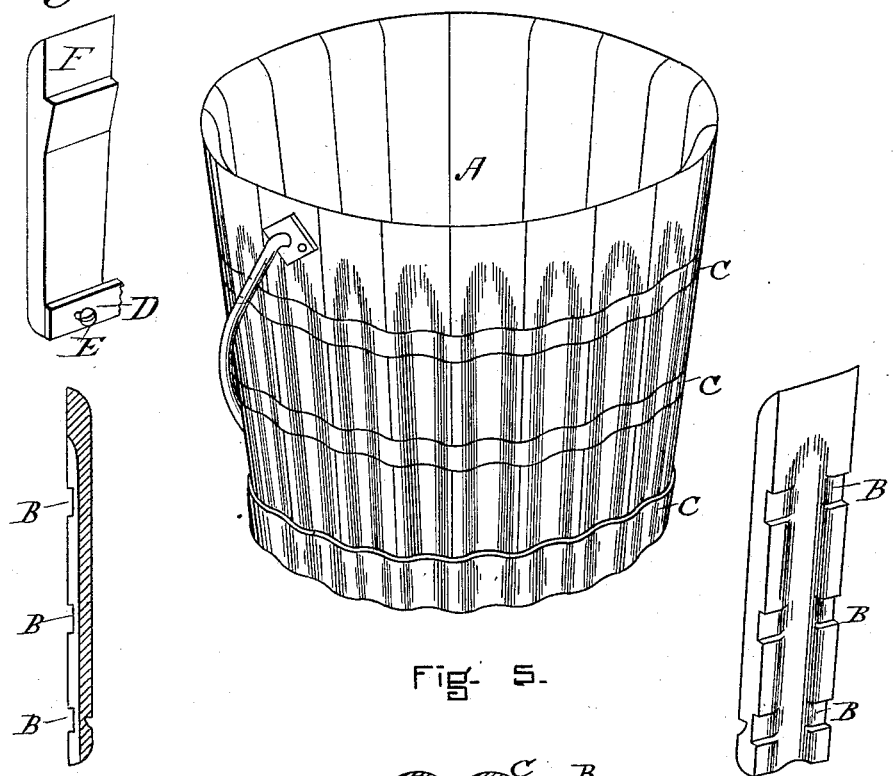
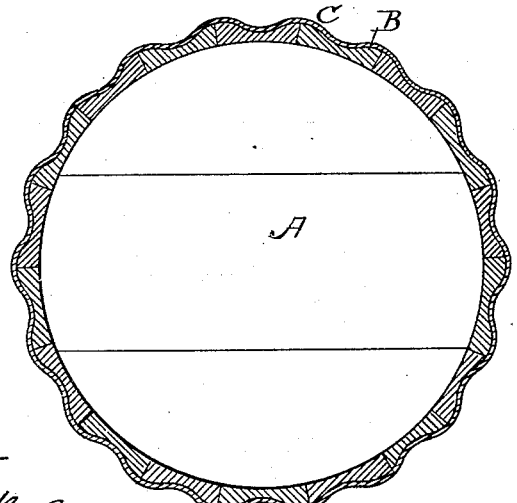
WITNESSES.
Frank H. Parker
Matthew H. Blunt
INVENTOR.
Israel L. G. Rice

UNITED STATES PATENT OFFICE.

ISRAEL L. G. RICE, OF BROOKLINE, MASSACHUSETTS.

PAIL STAVE AND HOOP.

SPECIFICATION forming part of Letters Patent No. 342,135, dated May 18, 1886.

Application filed November 20, 1885. Serial No. 183,425. (No model.)

*To all whom it may concern:*

Be it known that I, ISRAEL L. G. RICE, a citizen of the United States, residing at Brookline, in the county of Norfolk and State of Massachusetts, have invented certain new and useful Improvements in Staves, and in the method of fastening the same, of which the following is a specification.

My invention relates to improvements in staves for pails, barrels, tubs, &c., which, when grouped together in position for the hoops to be put on them, will have grooves, or projections, shoulders, or supports, around the entire periphery of the staves, in which grooves, or resting against such projections, shoulders, or supports, will be placed corrugated elastic hoops, preferably made of thin flat steel, the object of the corrugated elastic hoops being to hold the staves firmly together even when they become dry and shrunken, and the object of the grooves or shoulders, &c., being to prevent the hoops from slipping off should the staves become so very much shrunken that the elastic corrugated hoop fits loosely around them.

The accompanying drawings illustrate the invention.

Figure 1:
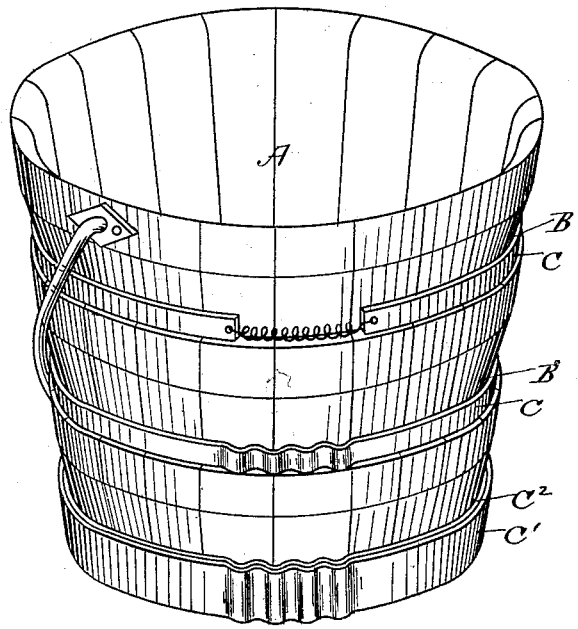
Figure 3:
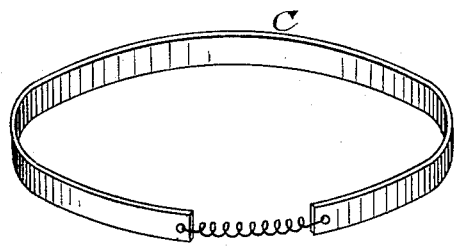
Figure 4:
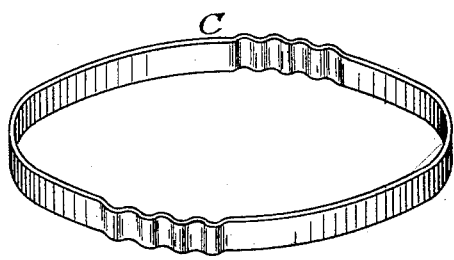
Figure 2:
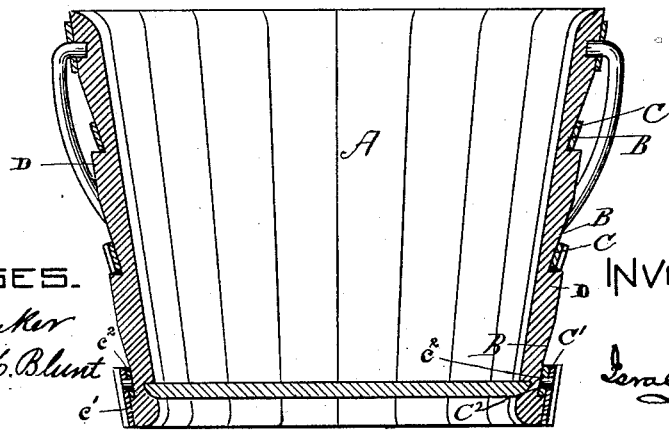

Figure 1 shows a pail whose staves at the top and bottom have grooves around their outer periphery to receive the corrugated hoops. Fig. 2 is a section of the same. Fig. 3 shows a flat elastic hoop with a spiral-spring connection. This may be used in the groove in place of the corrugated hoop; but the corrugated hoop is preferable. Fig. 4 shows a corrugated elastic hoop. Fig. 5 shows the grooves cut around the periphery of a pail which has vertical grooves and corrugated elastic hoops. Such a pail is described and claimed in a patent granted to me November 10, 1885, No. 330,153. Fig. 6 is a horizontal section, looking downward, of a pail showing a corrugated elastic hoop. Fig. 7 is a sectional view of a stave having the vertical and horizontal grooves. Fig. 8 is a perspective view of the same. Fig. 9 shows a stave having a wooden shoulder for the hoop to rest against.

The pail A has grooves B B B cut in its outer periphery, or the staves have projections on them, which form shoulders to support the corrugated elastic hoops C C C'. The bottom hoop, C', is made with an inner flange, $C^2$. The hoop C' and the flange $C^2$ are corrugated alike, and are elastic, and when put on the pail this hoop springs so that the flange $C^2$ enters the grooves cut in the pail or rests on the shoulders or projections that may be on the staves. The object of a hoop constructed in this way is to prevent the hoop from coming off by means of the flange $C^2$ in the groove, even though the staves are very much shrunken, and the outer part of the hoop being below the bottom of the staves prevents them from being injured.

In Fig. 9 a stave having a wooden projection or shoulder, F, upon it is shown. The stave may be sawed out with this projection upon it. The hoops C C, being elastic, expand when pushed on to the pail, and, when they reach the grooves or pass the projections, spring into the grooves or against the pail.

What I claim as new, and desire to secure by Letters Patent, is—

1. A pail, barrel, tub, or other article made of staves having circumferential grooves, shoulders, projections, or other similar supports for the hoops, combined with corrugated elastic hoops, substantially as set forth.

2. The combination of a pail, barrel, tub, or other article made of staves having vertical grooves and horizontal grooves with an elastic hoop, substantially as set forth.

3. The elastic hoop C' with an inner flange, $C^2$, to fit the groove in the staves, substantially as and for the purpose set forth.

ISRAEL L. G. RICE.

Witnesses:
FRANK G. PARKER,
MATTHEW M. BLUNT.